US011017030B1

(12) United States Patent
Westmoreland et al.

(10) Patent No.: US 11,017,030 B1
(45) Date of Patent: May 25, 2021

(54) METHOD, APPARATUS, AND SYSTEM FOR RECEIVING AND WEIGHTING NON-SCHEMA DATA ENTRIES IN SPATIAL INSTANCES OF HETEROGENEOUS DATABASES

(71) Applicant: Proof of Concept, LLC, Austin, TX (US)

(72) Inventors: Andrew B. Westmoreland, Austin, TX (US); Timothy Hanus, Austin, TX (US)

( * ) Notice: Subject to any disclaimer, the term of this patent is extended or adjusted under 35 U.S.C. 154(b) by 108 days.

(21) Appl. No.: 16/537,510

(22) Filed: Aug. 9, 2019

Related U.S. Application Data

(60) Provisional application No. 62/717,219, filed on Aug. 10, 2018.

(51) Int. Cl.
*G06F 16/906* (2019.01)
*H04L 29/08* (2006.01)
*G06F 16/9035* (2019.01)

(52) U.S. Cl.
CPC ........ *G06F 16/906* (2019.01); *G06F 16/9035* (2019.01); *H04L 67/146* (2013.01); *H04L 67/22* (2013.01)

(58) Field of Classification Search
CPC . G06F 16/906; G06F 16/9035; H04L 67/146; H04L 67/22
USPC ....................................................... 707/737
See application file for complete search history.

(56) References Cited

U.S. PATENT DOCUMENTS

| 9,773,028 | B2 * | 9/2017 | Lin ....................... G06F 16/211 |
| 10,339,147 | B1 * | 7/2019 | Barmes ............... G06F 16/9535 |
| 10,853,332 | B2 * | 12/2020 | Novik ................... G06F 16/213 |
| 2007/0005658 | A1 * | 1/2007 | Myllymaki .......... G06F 16/258 |
| 2008/0005197 | A1 * | 1/2008 | Chang .................... G06F 16/84 |
| 2017/0316084 | A1 * | 11/2017 | Pogrebtsov ............ G06N 5/022 |

OTHER PUBLICATIONS

Theobald, Martin, et al., "TopX and XXL at INEX 2005", INEX 2005, LNCS 3977, Springer-Verlag, Berlin, Germany, © 2006, pp. 282-295.*

* cited by examiner

*Primary Examiner* — Robert Stevens

(57) ABSTRACT

A computing system receives non-schema data pieces including electronic identifications and one or more attributes that are associated each of the electronic identification. Each of the one or more attributes associated with an electronic identification has a quantity. The computing system generates, in a data store, one or more sets of one or more data fields to store the each of the electronic identifications and each of the one or more attributes associated with each of the one or more electronic identifications. A quantity of each set of one or more data fields is equal to one more than a quantity of one or more attributes associated with a particular electronic identification. The computing system stores each of the electronic identifications and each of the one or more attributes associated with each of the electronic identifications in a different data field of each set of one or more data fields.

20 Claims, 8 Drawing Sheets

METHOD, APPARATUS, AND SYSTEM FOR RECEIVING AND WEIGHTING NON-SCHEMA DATA ENTRIES IN SPATIAL INSTANCES OF HETEROGENEOUS DATABASES

TECHNICAL FIELD

The present disclosure relates to receiving and weighting non-schema data for data aggregation and correlation.

BACKGROUND

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY

This disclosure provides systems and methods for receiving and weighting non-schema data.

In a first embodiment, the disclosure provides an apparatus including a computing system that is communicatively linked to one or more servers. The computing system includes at least one memory and at least one processor. The computing system is configured to receive a first set of non-schema data including one or more electronic identifications and one or more attributes that are associated with each electronic identification of the one or more electronic identifications from the first set of non-schema data. The computing system is also configured to receive a second set of non-schema data including one or more electronic identifications and one or more attributes that are associated with each electronic identification of the one or more electronic identifications from the second set of non-schema data. The computing system is further configured to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the computing system is configured to assign an independent score to each attribute of the one or more attributes from the third set of non-schema data. The computing system is also configured to identify a common attribute of the one or more attributes that is associated with at least two electronic identifications of the plurality of electronic identifications. The computing system is further configured to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

In a second embodiment, the disclosure provides a method implemented by a computing system. The method includes receiving, by the computing system, a first set of non-schema data including one or more electronic identifications and one or more attributes that are associated with each electronic identification of the one or more electronic identifications from the first set of non-schema data. The method also includes receiving, by the computing system, a second set of non-schema data including one or more electronic identifications and one or more attributes that are associated with each electronic identification of the one or more electronic identifications from the second set of non-schema data. The method further includes combining, by the computing system, the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the method includes assigning, by the computing system, an independent score to each attribute of the one or more attributes from the third set of non-schema data. The method also includes identifying, by the computing system, a common attribute of the one or more attributes that is associated with at least two electronic identifications of the plurality of electronic identifications. The method further includes, based on the independent scores assigned to each common attribute of the one or more attributes that are associated with the at least two electronic identifications of the plurality of electronic identifications, determining, by the computing system, whether to select at least one electronic identification of the at least two electronic identifications of the plurality of electronic identifications.

In a third embodiment, the disclosure provides a non-transitory, computer-readable storage medium. The non-transitory, computer-readable storage medium stores one or more executable instructions that, when executed by at least one processor, cause the at least one processor to receive a first set of non-schema data including one or more electronic identifications and one or more attributes that are associated with each electronic identification of the one or more electronic identifications from the first set of non-schema data. The one or more executable instructions that, when executed by at least one processor, also cause the at least one processor to receive a second set of non-schema data including one or more electronic identifications and one or more attributes that are associated with each electronic identification of the one or more electronic identifications from the second set of non-schema data. The one or more executable instructions that, when executed by at least one processor, further cause the at least one processor to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the non-transitory, computer-readable storage medium stores one or more executable instructions that, when executed by at least one processor, cause the at least one processor to assign an independent score to each attribute of the one or more attributes from the third set of non-schema data. The one or more executable instructions that, when executed by at least one processor, also cause the at least one processor to identify a common attribute of the one or more attributes that is associated with at least two electronic identifications of the plurality of electronic identifications. The one or more executable instructions that, when executed by at least one processor, further cause the at least one processor to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
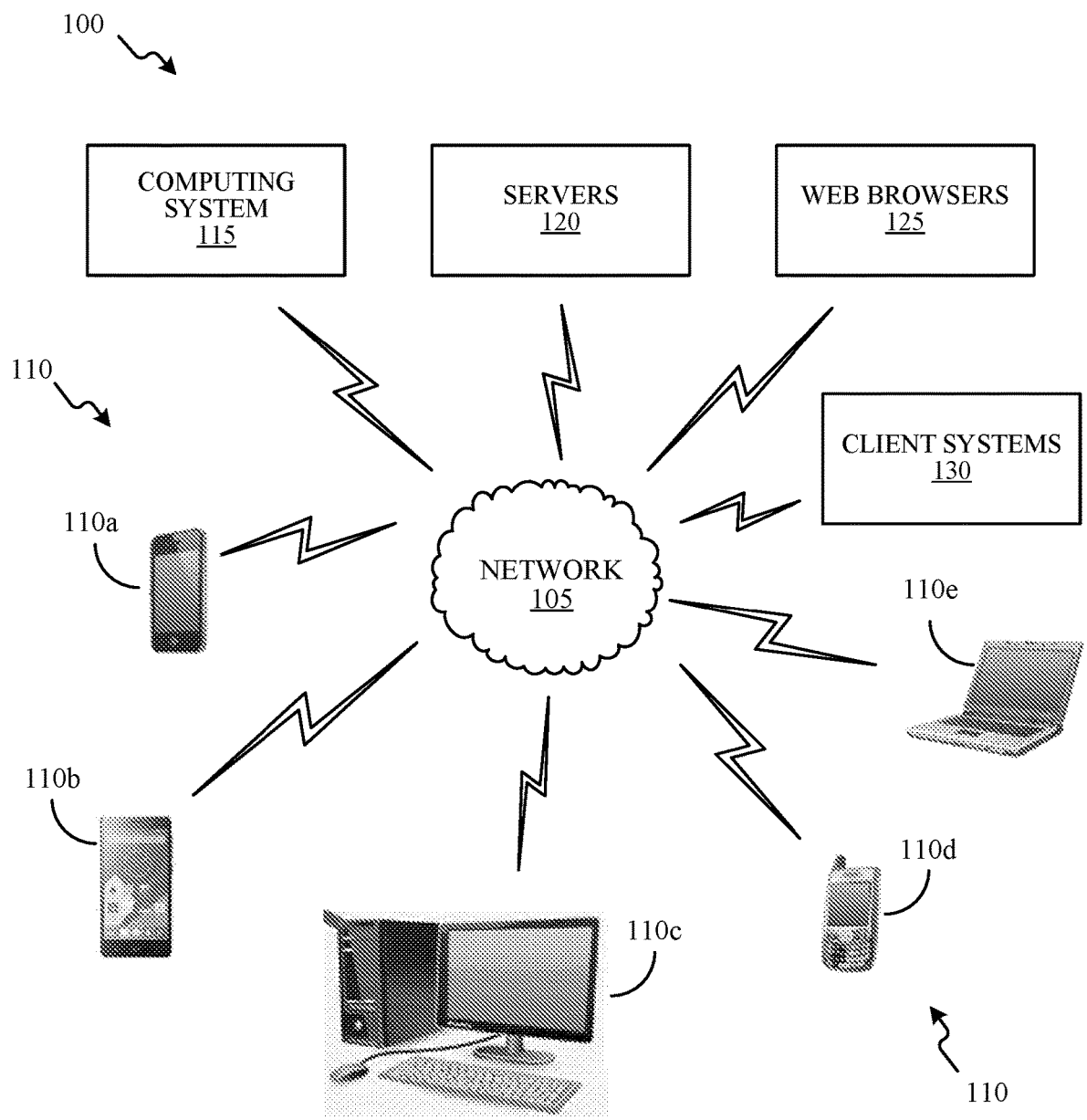
FIG. 1 illustrates a non-limiting, example network context for operating a computing system according to certain embodiments of this disclosure.

FIG. 1 illustrates a non-limiting, example network context 100 for operating computing system 115 according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., an Ethernet connection) or over a wireless connection (e.g., a wireless local area network "WLAN" connection, a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit-switched cellular, 3G, LTE, WiBro) and internet protocols (e.g., HTTP).

The one or more constituent networks of the network 105 provide two-way electronic connectivity and electronic communication between each of the electronic devices 110 and the one or more servers 120. In certain embodiments, the one or more constituent networks of the network 105 provide two-way electronic connectivity and electronic communication between each of the electronic devices 110 and the one or more servers 120 using one or more same or different channels, protocols, or networks of network 105. For example, a circuit-switched cellular protocol wireless network of the network 105 provides electronic connectivity and electronic communication between the first electronic device 110*a* and the one or more servers 120 while a POTS wireless network of the network 105 provides electronic connectivity and electronic communication between the third electronic device 110*c* and the one or more servers 120.

In certain embodiments, the network context 100 includes one or more electronic devices 110. The one or more electronic devices 110 may include an iPhone™ 110a, a tablet 110*b*, a desktop computer 110*c*, a smartphone 110*d*, a laptop computer 110*e*, or the like. In certain embodiments, each of the one or more electronic devices 110 is configured to initiate a web browser session with a web browser 125 or access and display the one or more web browsers 125 through the network 105 for viewing by a user and for interaction between the user and the one or more web browsers 125. Additionally, or alternatively, each of the one or more electronic devices 110 is configured to transmit one or more items of anonymous personal identification information to a web browser 125 during a web browser session.

In certain embodiments, each of the one or more electronic devices 110 may be configured to store data pieces received from a web browser 125 during a web browser session. Each data piece may contain at least one of an electronic address or one or more items of anonymous personal identification information that were transmitted by the electronic device 110 to the web browser 125 during the web browser session. The electronic address may provide an anonymous indication of an electronic communication reception or transmission location of the electronic device 110 so that one or more other electronic devices 110, one or more servers 120, or one or more web browsers 125 may electronically communicate with that electronic device 110. For example, an electronic address may include at least one of a MAC address, an IMEI number, an electronic device serial number, a pointer associated with a data port of the electronic device, or the like. An item of anonymous personal identification information may include information associated with a user of an electronic device such as at least one of an email address, a name, a postal address, a phone number, a geographic area, a gender, a heritage, an age group, an economic status, a social status, a group association, an interest, or a preference of the user of the electronic device. In certain embodiments, the electronic device 110 includes an electronic device display screen, an electronic device memory, and at least one electronic device processor. The electronic device may be configured to access and display content from one or more web browsers 125 on the electronic device display screen.

In certain embodiments, electronic addresses and items of anonymous personal identification information may be used as electronic identifications and attributes described herein. An electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number, a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g., a behavior performed by a user), a preference of the user of the electronic device, or the like. In certain embodiments, an attribute may be extracted from at least one of an item of anonymous personal identification information or an electronic address (e.g., when an IMEI number indicates a particular brand of electronic device used by an individual).

The network context 100 may, according to certain embodiments, include one or more servers 120. In certain embodiments, the one or more servers 120 store electronic identifications and associated attributes. As described herein, the computing system 115 may receive and weight data pieces in the server 120 that are generated during a browser session initiated through an electronic device 110 with a web browser 125. The data pieces may include at least one of an electronic identification or one or more attributes associated with the electronic identification. In certain embodiments, the data pieces may be received by the computing system 115 in a schema form (e.g., a schema format) and may be stored in the server 120 according to the schema form. In certain embodiments, the data pieces may be received by the computing system 115 in a non-schema form (e.g., a non-schema format) and may be stored in the server 120 simply as the data pieces are received by the computing system 115 (e.g., stored in the non-schema form).

In some embodiments, one or more servers 120 may store user profiles containing electronic identifications and associated attributes in a key value data store. Thus, by knowing an electronic identification that is indicative of a key value of a user profile, all items of electronic identifications and associated attributes stored in the user profile may be identified and viewed via display screen.

It should be understood that the term "schema" may refer to the organization of data as a blueprint of how the database is constructed (e.g., divided into database tables in the case of relational databases). Thus, electronic identifications and associated attributes in each of the data pieces may have a schema form that has categorized or characterized each of the electronic identifications and each of the associated attributes into specific categories. Conversely, non-schema data may be raw data or data that is not been categorized or characterized. Thus, electronic identifications and associated attributes in each of the data pieces may be raw data or data that is not been categorized or characterized into a specific category.

In certain embodiments, the network context 100 includes one or more web browsers 125. The one or more web browsers 125 may be configured to contain display content for viewing by an electronic device 110 when the electronic device 110 is engaged in a web browser session with the web browser 125. In certain embodiments, the one or more web browsers are configured to transmit data pieces to the electronic device 110 for storage in a memory of the electronic device 110 when the electronic device 110 is engaged in a web browser session with the web browser 125. The one or more web browsers 125 may also be configured to receive data pieces including at least one of one or more electronic identification or one or more associated attributes transmitted from an electronic device 110 when the electronic device 110 is engage in a web browser session with the one or more web browsers 125. The electronic device 110 may store the data pieces including the electronic identifications and the associate attributes transmitted to the web browser and in some embodiments, an electronic device address associated with the electronic device 110 in the data piece received from the web browser 125 located in the memory of the electronic device 110. The computing system 115, described herein, may receive or retrieve, from at least one of the electronic device 110 or the web browser 125, the data pieces including at least one of one or more electronic identification or one or more associated attributes transmitted from an electronic device 110.

Additionally, or alternatively, the network context 110 may include one or more client systems 130. A client system 130 may be a system operated by an independent entity (e.g., separate from the computing system 115 and the one or more servers 120) that transmits, to the computing system 115, one or more data pieces including at least one of one or more electronic identifications and one or more associated attributes. For example, the client system 130 may transmit, to the computing system 115, a first set of non-schema data pieces each containing at least one of one or more electronic identifications or one or more associated attributes. Subsequently, the client system 130 may transmit, to the computing system 115, a second set of non-schema data pieces each containing at least one of one or more electronic identifications or one or more associated attributes. Each of the non-schema data pieces transmitted from the client system 130 may contain at least one of one or more electronic identifications or one or more associated attributes that may be associated with users of interest to the independent entity utilizing the client system 130. In certain embodiments, each of the one or more associated attributes may include a time indicating when the associated attribute was recorded or took place.

In certain embodiments, the network context 100 includes one or more computing systems 115. The computing system 115, utilizing one or more processors, is configured to perform one or more non-schema data reception and weighting operations as described herein. For example, the computing system 115, utilizing one or more processors, may be configured to receive a first set of non-schema data including one or more electronic identifications and one or more attributes that are associated with each electronic identification of the one or more electronic identifications from the first set of non-schema data. The computing system 115, utilizing the one or more processors, may also be configured to receive a second set of non-schema data including one or more electronic identifications and one or more attributes that are associated with each electronic identification of the one or more electronic identifications from the second set of non-schema data.

The computing system, utilizing the one or more processors, may be further configured to combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. In addition, the computing system, utilizing the one or more processors, may be configured to assign an independent score to each attribute of the one or more attributes from the third set of non-schema data. The computing system, utilizing the one or more processors, may also be configured to identify a common attribute of the one or more attributes that is associated with at least two electronic identifications of the plurality of electronic identifications. The computing system, utilizing the one or more processors, may be further configured to, based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

Figure 2:
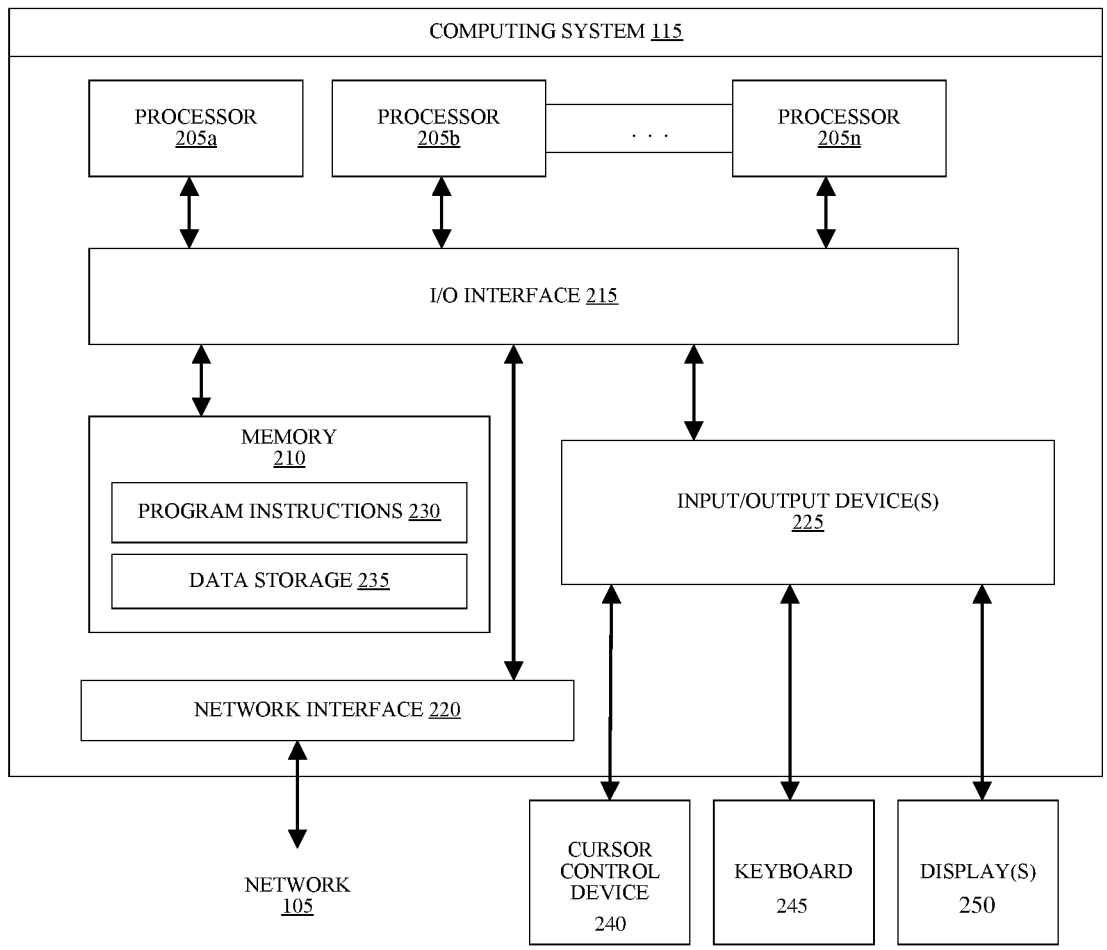
FIG. 2 illustrates a non-limiting, example computing system configured for performing one or more non-schema data reception and weighting operations according to certain embodiments of this disclosure.

FIG. 2 illustrates a non-limiting, example of the computing system 115 illustrated in FIG. 1. The computing system 115 is configured to execute any and all of the embodiments and operations described herein including embodiments for performing one or more non-schema data reception and weighting operations. In certain embodiments, the computing system 115 may perform one or more non-schema data reception and weighting operations using the network 105 to receive one or more sets of non-schema data pieces, combine each of the one or more sets of non-schema data pieces into a plurality of non-schema data pieces, assign an independent score to each attribute from the plurality of non-schema data pieces, identify a common attribute of the one or more attributes that are associated with the at least two electronic identifications of the plurality of electronic identifications, determine whether to select at least one electronic identification of the at least two electronic identifications of the plurality of electronic identifications. In different embodiments, the computing system 115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing one or more non-schema data reception and weighting operations, as described herein, may be executed on one or more computing systems 115, which may interact with various other devices. In the illustrated embodiment, the computing system 115 may include one or more processors 205*a*, 205*b*, . . . , and 205*n* (hereinafter "one or more processors 205," "processors 205," or "processor 205") coupled to a memory 210 via an input/output (I/O) interface 215. The computing system 115 may further include a network interface 220 coupled to I/O interface 215, and one or more input/output devices 225, such as cursor control device 240 of the electronic device 110, a keyboard 245 of the electronic device 110, and one or more displays 250 of the electronic device 110. In some cases, it is contemplated that embodiments may be implemented using a single instance of computing system 115, while in other embodiments multiple such systems, or multiple nodes making up the computing system 115, may be configured to host different portions or instances of embodiments. For example, in one embodiment some elements may be implemented via one or more nodes of computing system 115 that are distinct from those nodes implementing other elements.

In various embodiments, the computing system 115 may be a uniprocessor system including one processor 205a, or a multiprocessor system including several processors 205a-205n (e.g., two, four, eight, or another suitable number). The processor 205 may be any suitable processor capable of executing instructions including instructions or operations for performing non-schema data reception and data weighting as described herein. For example, in various embodiments the processor 205 may be general-purpose or embedded processors implementing any of a variety of instruction set architectures (ISAs), such as the x86, PowerPC, SPARC, or MIPS ISAs, or any other suitable ISA. In multiprocessor systems, each of processors 205 may commonly, but not necessarily, implement the same ISA.

The memory 210 may be configured to store the executable instructions or program instructions 230 in the data storage 235 accessible by the processor 205. In various embodiments, the memory 210 may be implemented using any suitable memory technology, such as static random access memory (SRAM), synchronous dynamic RAM (SDRAM), nonvolatile/Flash-type memory, or any other type of memory. In the illustrated embodiment, the program instructions 230 may be configured to implement a system for performing one or more non-schema data reception and weighting operations incorporating any of the functionality, as described herein. In some embodiments, program instructions 230 or data may be received, sent, or stored upon different types of computer-accessible media or on similar media separate from the memory 210 or the computing system 115. The computing system 115 is described as implementing at least some of the functionality of functional blocks in the figures described herein.

In certain embodiments, the I/O interface 215 may be configured to coordinate I/O traffic between the processor 205, the memory 210, and any peripheral devices in the computing system 115, including the network interface 220 or other peripheral interfaces, such as the input/output devices 225. In some embodiments, the I/O interface 215 may perform any necessary protocol, timing or other data transformations to convert data signals from one component (e.g., the memory 210) into a format suitable for use by another component (e.g., the processor 205). In some embodiments, the I/O interface 215 may include support for devices attached through various types of peripheral buses, such as a variant of the Peripheral Component Interconnect (PCI) bus standard or the Universal Serial Bus (USB) standard, for example. In some embodiments, the function of the I/O interface 215 may be split into two or more separate components, such as a north bridge and a south bridge, for example. Also, in some embodiments some or all of the functionality of the I/O interface 215, such as an interface to the memory 210, may be incorporated directly into the processor 205.

The network interface 220 may be configured to allow data to be exchanged between the computing system 115 and other devices attached to the network 105 (e.g., one or more servers 120) or between nodes of the computing system 115. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 225 may, in some embodiments, include one or more display terminals, keyboards, keypads, touchpads, scanning devices, voice, or optical recognition devices, or any other devices suitable for entering or accessing data by one or more computing systems 115. Further, various other sensors may be included in the I/O devices 225, such as imaging sensors, barometers, altimeters, LIDAR, or any suitable environmental sensor. Multiple input/output devices 225 may be present in the computing system 115 or may be distributed on various nodes of the computing system 115. In some embodiments, similar input/output devices may be separate from the computing system 115 and may interact with one or more nodes of the computing system 115 through a wired or wireless connection, such as over the network interface 220.

As shown in FIG. 2, the memory 210 may include program instructions 230, which may be processor-executable to implement any element, action, or operation including non-schema data reception and weighting operations, as described herein. In certain embodiment, the program instructions may implement at least a portion of methods described herein, such as the methods illustrated by FIGS. 3-7. In other embodiments, different elements and data may be included. Note that the data storage 235 may include any data or information, as described herein.

Those skilled in the art will appreciate that the computing system 115 is merely illustrative and is not intended to limit the scope of embodiments. In particular, the computing system 115 and devices may include any combination of hardware or software that can perform the indicated functions, including computers, network devices, Internet appliances, PDAs, wireless phones, pagers, GPUs, specialized computer systems, information handling apparatuses, or the like. The computing system 115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 115 may be transmitted to the computing system 115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Figure 3:
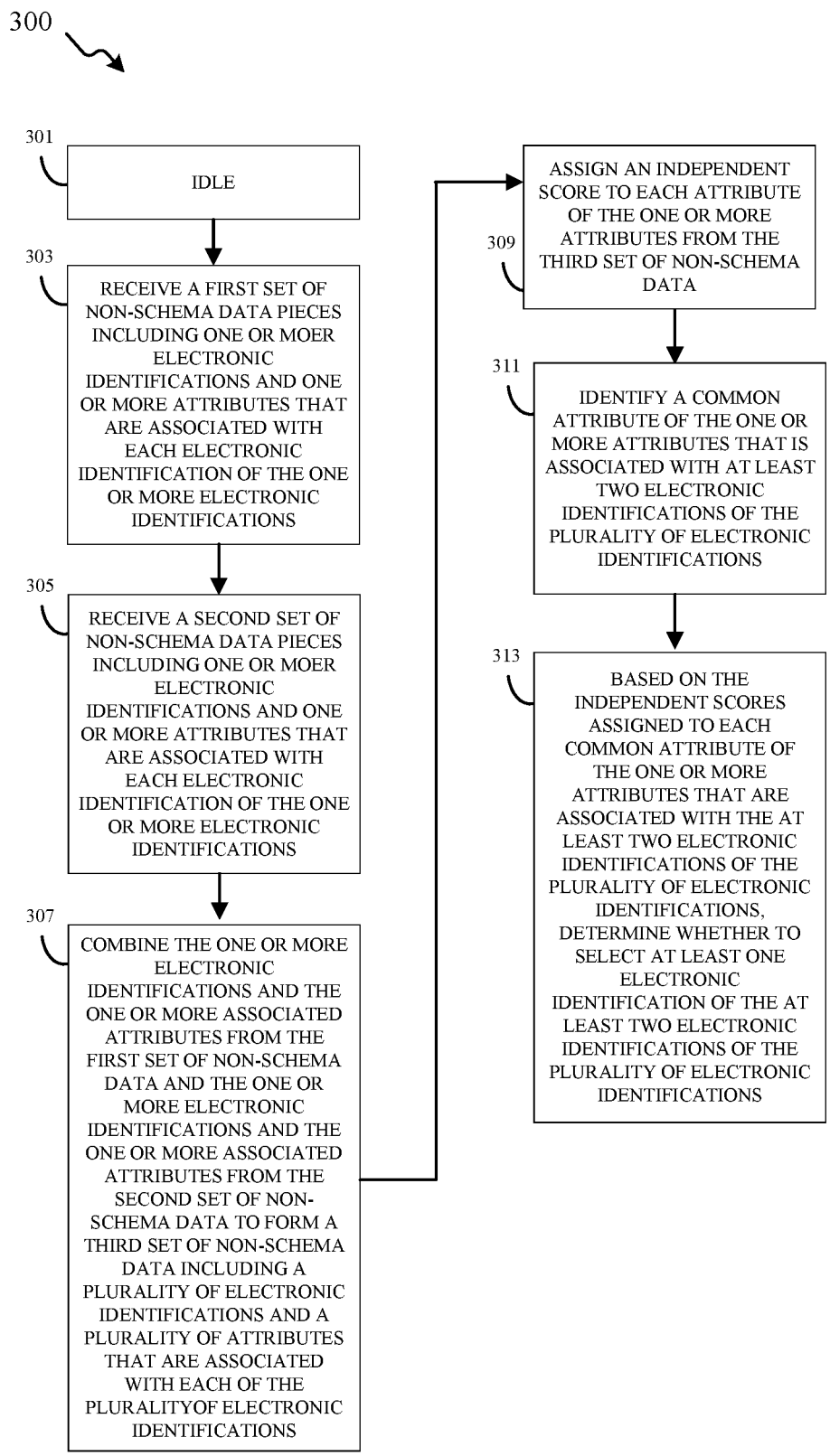
FIGS. 3-7 illustrate flow diagrams of methods for one or more non-schema data reception and weighting operations according to certain embodiments of the disclosure.

As described herein, the computing system 115, utilizing the at least one processor 205, is configured to execute one or more non-schema data reception and weighting operations. The functions performed by the computing system 115 are described herein with respect to methods illustrated in FIGS. 3-7. FIG. 3 illustrates a method 300 implemented by the computing system 115, utilizing the at least one processor 205, for performing one or more non-schema data reception and weighting operations according to certain embodiments of this disclosure. Although certain details will be provided with reference to the method 300 of FIG. 3, it should be understood that other embodiments may include more, less, or different method steps.

At step 301, the computing system 115 is in an idle state at least with respect to performing one or more non-schema data reception and weighting operations. At step 303, the computing system 115 receives a first set of non-schema data including one or more electronic identifications and one or more attributes that are associated with each electronic identification of the one or more electronic identifications from the first set of non-schema data.

For example, the computing system 115, utilizing the at least one processor 205, may have received the first set of non-schema data pieces from the client system 130 or the one or more servers 120. The first set of non-schema data pieces may include a first electronic identification in the form of an electronic device serial number and an associated attribute in the form of an indication that a user associated with the first electronic identification is a member of an amateur curling team. As described herein, an electronic identification may be a unique identification associated with an electronic device or a user of an electronic device. An electronic identification may be at least one of an electronic address or an item of anonymous personal identification information. For example, an electronic identification may include at least one of a MAC address, an IMEI number, an electronic device serial number, a pointer associated with a data port of the electronic device, an email address, a name, a postal address, a phone number, a username, or the like. An attribute may be a characteristic or information associated with a user of an electronic device. An attribute may be extracted from an item of anonymous personal identification information. For example, an attribute may include at least one of an email address, a name, a postal address, a phone number, a geographic area, a gender, a heritage, an age group, an economic status, a social status, a group association, an interest, a behavior (e.g., a behavior performed by a user, a click on a particular link displayed by a web browser), a preference of the user of the electronic device, or the like. In certain embodiments, an attribute may be extracted from at least one of an item of anonymous personal identification information or an electronic address (e.g., when an IMEI number indicates a particular brand of electronic device used by an individual).

At step 305, the computing system 115 receives a second set of non-schema data including one or more electronic identifications and one or more attributes that are associated with each electronic identification of the one or more electronic identifications from the second set of non-schema data. Step 305 may be the same as or at least similar to step 303 described herein. For example, the computing system 115, utilizing the at least one processor 205, may have received the second set of non-schema data pieces from the client system 130 or from the one or more servers 120. The second set of non-schema data pieces may include a second electronic identification in the form of an email address and an associated attribute in the form of an indication that a user associated with the second electronic identification is a member of a professional chess team.

In certain embodiments, the computing system 115 may receive one or more set of non-schema data (e.g., the first set of non-schema data, the second set of non-schema data) from the one or more client servers 130. In certain embodiments, the computing system 115 may receive non-schema data (e.g., the first set of non-schema data, the second set of non-schema data) from the one or more servers 120. As described herein, the computing system 115, through the one or more web browsers 125 or through one or more electronic devices 110 electronically communicating with the one or more web browsers 125 during web browser sessions, may have received a plurality or a multitude of electronic identifications each having one or more associated attributes. The computing system 115 may have stored each of the electronic identifications and the one or more attributes associated with each of the electronic identifications in a data store (e.g., the one or more servers 120). The computing system 115 may have placed each of the electronic identifications and each of the one or more attributes associated with each of the electronic identifications in one or more user profiles. In certain embodiments, at least one user profile of the one or more user profiles may contain only one electronic identification having one or more associated attributes. In certain embodiments, at least one user profile of the one or more user profiles may contain two or more electronic identifications with each electronic identification having one or more associated attributes. The computing system 115 may copy the contents of each user profile in the data store (e.g., the one or more servers 120) or at least one user profile in the data store (e.g., the one or more servers 120) and subsequently combine them with one or more other received sets of non-schema data to form the third set of non-schema data described herein.

At step 307, the computing system 115 combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. For example, the computing system 115 may receive the first set of non-schema data including the first electronic identification in the form of the electronic device serial number and the associated attribute indicating that the user associated with the first electronic identification is a member of an amateur curling team. The computing system 115 may also receive the second set of non-schema data including the second electronic identification in the form of the email address and the associated attribute indicating that the user associated with the second electronic identification is a member of a professional chess team.

After receiving the first set of non-schema data and the second set of non-schema data, the computing system 115 may combine the first set of non-schema data with the second set of non-schema data to form a third set of non-schema data. For example, the computing system 115 may form the third set of non-schema data so that the third set of non-schema data includes one or more electronic identifications and one or more associated attributes from the first set of non-schema data including the first electronic identification in the form of the electronic device serial number and the associated attribute indicating that the user associated with the first electronic identification is a member of an amateur curling team. The computing system 115 may also form the third set of non-schema data so that the third set of non-schema data includes one or more electronic identifications and one or more associated attributes from the second set of non-schema data including the second electronic identification in the form of the email address and the associated attribute indicating that the user associated with the second electronic identification is a member of a professional chess team. In certain embodiments, the computer system 115 may store the third set of non-schema data in the one or more servers 120.

At step 309, the computing system 115 assigns an independent score to each attribute of the one or more attributes from the third set of non-schema data. For example, after the computing system 115 forms the third set of non-schema data, the computing system 115 may assign an independent score to each attribute in the third set of non-schema data. In certain embodiments, an independent score may be a score assigned to an attribute indicating a level of truthfulness of the attribute. An independent score may be based on at least one of a quantity of same attributes associated with a particular electronic identification, a time when an attribute manifested, or a quantity of same attributes associated with a first electronic identification and a second electronic identification that is linked to the first electronic identification, or the like.

In certain embodiments, an independent score may be a score that is assigned to an attribute that indicates a degree of likelihood that the information purported by the attribute is true. For example, the computing system 115 may assign an independent score to the attribute associated with the first electronic identification indicating a higher likelihood of truth if the associated attribute was recorded or received a week before being assigned an independent score compared to if the associated attribute was recorded or received five years before being assigned an independent score. In this case, a higher degree of truthfulness may be associated with information provided by attributes that have more recently manifested compared to information provided by attributes that manifested much earlier in time.

In certain embodiments, an independent score may be a score that is assigned to an attribute that indicates a degree of likelihood that the information purported by the attribute is true and that indicates a degree of likelihood that such an attribute would be associated with the electronic identification. For example, the computing system 115 may have received at least two different data pieces each including the same second electronic identification but having different associated attributes in each of the different data pieces. A first data piece of the at least two different data pieces may contain the second electronic identification and the associated attribute indicating that the user associated with the second electronic identification is a member of a professional chess team. A second data piece of the at least two different data pieces may contain the same second electronic identification and an associated attribute indicating that the user associated with the second electronic identification recently purchased a book on how to play chess for beginners. The computing system 115, examining only the first data piece, may assign an independent score to the attribute contained in the first data piece that indicates a first degree of likelihood (e.g., a higher degree of likelihood) that the user associated with the first electronic identification is a member of the professional chess team. However, the computing system 115, examining both the first data piece and the second data piece, may assign an independent score to the attribute contained in the first data piece that indicates a second degree of likelihood (e.g., a lower degree of likelihood) that the user associated with the first electronic identification is a member of the professional chess team because it may be less likely that an individual person who is a member of a professional chess team would also purchase a book on how to play chess for beginners.

In certain embodiments, an independent score may be a score that is assigned to an attribute that indicates a degree of likelihood that the information purported by the attribute is true and that indicates a degree of likelihood that such an attribute would be associated with a user associated with the electronic identification. For example, the computing system 115 may have received at least two different data pieces each including different electronic identifications but each sharing the same associated attribute. A first data piece of the at least two different data pieces may contain the first electronic identification in the form of the electronic device serial number and the associated attribute indicating that the user associated with the first electronic identification is a member of a professional chess team. A second data piece of the at least two different data pieces may contain another electronic identification in the form of an email address and the associated attribute indicating that the user associated with the other electronic identification is a member of a professional chess team.

In addition, the computing system 115 may also identify, for example, in the one or more servers 120, another data piece or a user profile that indicates that the electronic serial number, provided as the first electronic identification, is associated with the same user that uses the email address, provided as the other electronic identification. The computing system 115, examining only the first data piece, may assign an independent score to the attribute contained in the first data piece that indicates a first degree of likelihood (e.g., a lower degree of likelihood) that the user associated with the first electronic identification is a member of the professional chess team. However, the computing system 115, examining both the first data piece and the other data piece, may assign an independent score to the attribute contained in the first data piece that indicates a second degree of likelihood (e.g., a higher degree of likelihood) that the user associated with the first electronic identification is a member of a professional chess team because it may be more likely that a user, linked to or associated with at least two different electronic identifications that have each been associated with the same attribute indicating that a user associated with the attribute is a member of a professional chess team, is actually a member of a profession chess team than a user linked to or associated with only one electric identification that has been associated with the attribute indicating that a user associated with the attribute is a member of a professional chess team.

At step 311, the computing system 115 identifies a common attribute of the one or more attributes that is associated with at least two electronic identifications of the plurality of electronic identifications. For example, after the computing system 115 forms the third set of non-schema data, the computing system 115 may search through all of the received attributes associated with each electronic identification from the third set of non-schema data. The computing system 115 may identify two or more electronic identifications from the third set of non-schema data that share a common attribute. For example, the computing system 115 may have identified a first electronic identification that is associated with a first attribute indicating that the user associated with the first electronic identification is a high-wealth individual, a second attribute indicating that the user associated with the first electronic identification enjoys maintaining his or her yard, and a third attribute indicating that the user associated with the first electronic identification drinks beer. The computing system 115 may have also identified a second electronic identification that is associated with a first attribute indicating that the user associated with the second electronic identification plays golf, a second attribute indicating that the user associated with the second electronic identification has young children, a third attribute indicating the user associated with the second electronic identification enjoys vacationing in the Caribbean, and a fourth attribute indicating that the user associated with the second electronic identification is a high wealth individual. Based on the attributes of the first electronic identification and the second electronic identification, the computing system 115 may determine that a common attribute is that a user associated with the first electronic identification and a user associated with the second electronic identification are both high wealth individuals.

In certain embodiments, the computing system 115 may identify one or more attributes as a common attribute based on a relative quantity of electronic identifications from the third set of non-schema data that share different common attributes. For example, the computing system 115 may identify an attribute as a common attribute because the identified common attribute is associated with more electronic identifications of the third set of non-schema data than any other associated attribute. As another example, the computing system 115 may identify an attribute as a common attribute because the identified common attribute is associated with less electronic identifications of the third set of non-schema data than any other associated attribute.

In certain embodiments, the computing system 115 may identify one or more attributes as a common attribute based on a quantity of electronic identifications from the third set of non-schema data and that share different attributes relative to a threshold quantity. For example, the computing system 115 may identify an attribute as a common attribute because the identified common attribute is associated with a quantity of electronic identifications of the third set of non-schema data that exceeds a threshold quantity. As another example, the computing system 115 may identify an attribute as a common attribute because the identified common attribute is associated with a quantity of electronic identifications of the third set of non-schema data that is below a threshold quantity.

In certain embodiments, the computing system 115 may identify one or more attributes as a common attribute based on a relative quantity of each different attribute from the third set of non-schema data. For example, the computing system 115 may identify an attribute as a common attribute because the identified common attribute is present in the third set of non-schema data in a greater quantity than any other associated attribute. As another example, the computing system 115 may identify an attribute as a common attribute because the identified common attribute is presented in the third set of non-schema data in a lesser quantity than any other associated attribute.

In certain embodiments, the computing system 115 may identify one or more attributes as a common attribute based on quantities of different attributes that are present in the third set of non-schema data relative to a threshold quantity. For example, the computing system 115 may identify an attribute as a common attribute because the identified common attribute occurs or is present within the third set of non-schema data in a quantity that exceeds a threshold quantity. As another example, the computing system 115 may identify an attribute as a common attribute because the identified common attribute occurs or is present within the third set of non-schema data in a quantity that is below a threshold quantity.

In certain embodiments, the computing system 115 may identify the common attribute based on independent scores of different attributes that are shared by at least two electronic identifications from the third set of non-schema data. For example, the computing system 115 may identify an attribute as the common attribute because the selected common attribute is associated with a higher or greater average independent score than any other attributes that are associated with any electronic identification of the third set of non-schema data. As another example, the computing system 115 may select an attribute as the common attribute because the selected common attribute is associated with a lower or lesser average independent score than any other attributes that are associated with any electronic identification of the third set of non-schema data. As yet another example, the computing system 115 may select an attribute as the common attribute because the selected common attribute is associated with a higher or greater total cumulative independent score than any other attributes that are associated with any electronic identification of the third set of non-schema data. As another example, the computing system 115 may select an attribute as the common attribute because the selected common attribute is associated with a lower or lesser total cumulative independent score than any other attributes that are associated with any electronic identification of the third set of non-schema data.

As another example, the computing system 115 may select an attribute as the common attribute because the selected common attribute is associated with an average independent score that is greater than a threshold independent score. As another example, the computing system 115 may select an attribute as the common attribute because the selected common attribute is associated with an average independent score that is less than a threshold independent score. As yet another example, the computing system 115 may select an attribute as the common attribute because the selected common attribute is associated with a total cumulative independent score that is greater than a threshold independent score. As another example, the computing system 115 may select an attribute as the common attribute because the selected common attribute is associated with a total cumulative independent score that is less than a threshold independent score.

In certain embodiments, the computing system 115 may select an absence of a particular attribute as the common attribute. For example, the computing system 115 may select at least one electronic identification from the third set of non-schema data that is not associated with a particular attribute. In this case, the computing system 115 may create or add a fictitious attribute that is associated with each electronic identification of the third set of non-schema data that does not include the particular associated attribute.

In response to identifying all of the attributes associated with each of the electronic identifications from the third set of non-schema data, the computing system 115 may identify a common attribute from all of the attributes associated with each of electronic identifications from the third set of non-schema data. For example, the computing system 115 may determine that the first electronic identification and the second electronic identification share a common attribute indicating that the user associated with the first electronic identification and the user associated with the second electronic identification are both high wealth individuals. In certain embodiments, the computing system 115 may identify only two electronic identifications from the third set of non-schema data that share the common attribute. In certain embodiments, the computing system 115 may identify that more than two electronic identifications from the third set of non-schema data share the common attribute. In certain embodiments, the computing system 115 may identify that all electronic identifications from the third set of non-schema data share the second common attribute.

At step 313, the computing system 115, determines whether to select at least one electronic identification of the at least two electronic identifications of the plurality of electronic identifications for storage in a data store (e.g., the one or more servers 120). In certain embodiments, the computing system 115 may determine to select one or more electronic identifications that are each associated with a common attribute that is present within the third set of non-schema data in a quantity relative to a threshold quantity. For example, the computing system 115 may determine to select one or more electronic identifications that are each associated with a common attribute that is present within the third set of non-schema data in a quantity greater than a threshold quantity. As another example, the computing system 115 may determine to select one or more electronic identifications that are each associated with a common attribute that is present within the third set of non-schema data in a quantity less than a threshold quantity.

In certain embodiments, the computing system 115 may determine to select one or more electronic identifications that are each associated with a common attribute that is present within the third set of non-schema data in a quantity relative to one or more other attributes or other common attributes. For example, the computing system 115 may determine to select one or more electronic identifications that are each associated with a common attribute that is present within the third set of non-schema data that most frequently occurs or is present or that is one of several that most frequently occurs or is present. As another example, the computing system 115 may determine to select one or more electronic identifications that are each associated with a common attribute that is present within the third set of non-schema data that frequently occurs the least or is present the least or that is one of several that least occurring or the least present.

In certain embodiments, the computing system 115 may determine to select at least one electronic identification from the third set of non-schema data, based on independent scores of different attributes that are associated with and shared by at least two electronic identifications from the third set of non-schema data.

For example, the computing system 115 may select at least one electronic identification associated with a common attribute because the common attribute is associated with a higher or greater average independent score than any other attributes that are associated with any electronic identification of the third set of non-schema data. As another example, the computing system 115 may select at least one electronic identification associated with a common attribute because the common attribute is associated with a lower or lesser average independent score than any other attributes that are associated with any electronic identification of the third set of non-schema data. As yet another example, the computing system 115 may select at least one electronic identification associated with a common attribute because the common attribute is associated with a higher or greater total cumulative independent score than any other attributes that are associated with any electronic identification of the third set of non-schema data. As another example, the computing system 115 may select at least one electronic identification associated with a common attribute because the common attribute is associated with a lower or lesser total cumulative independent score than any other attributes that are associated with any electronic identification of the third set of non-schema data.

As another example, the computing system 115 may select at least one electronic identification associated with a common attribute because the common attribute is associated with an average independent score that is greater than a threshold independent score. As another example, the computing system 115 may select at least one electronic identification associated with a common attribute because the common attribute is associated with an average independent score that is less than a threshold independent score. As yet another example, the computing system 115 may select at least one electronic identification associated with a common attribute because the common attribute is associated with a total cumulative independent score that is greater than a threshold independent score. As another example, the computing system 115 may select at least one electronic identification associated with a common attribute because the common attribute is associated with a total cumulative independent score that is less than a threshold independent score.

In certain embodiments, the computing system 115 may determine whether to select at least one electronic identification of the at least two electronic identifications of the plurality of electronic identifications for storage in a set of non-schema data in a data store (e.g., the one or more servers 120) based on the independent scores assigned to each common attribute of the one or more attributes that are associated with the at least two electronic identifications of the plurality of electronic identifications. For example, after determining to select at least one electronic identification of the at least two electronic identifications from the third set of non-schema data, the computing system 115 may select the at least one electronic identification of the at least two electronic identifications from the third set of non-schema data and generate a fourth set of data that includes the at least one electronic identification of the at least two electronic identifications from the third set of non-schema data. The computing system 115 may store the fourth set of data in a data store (e.g., the one or more servers 120).

In certain embodiments, the common attribute may be one common attribute of a plurality of common attributes. For example, the common attribute may be a first common attribute. The computing system 115 may determine whether to select the at least one electronic identification of the at least two electronic identifications of the plurality of electronic identifications for storage in a set of non-schema data in a data store (e.g., the one or more servers 120) based on, for example, the independent scores assigned to each first common attribute of the one or more attributes that are associated with the at least two electronic identifications of the plurality of electronic identifications. The computing system 115 may also identify a second common attribute of the one or more attributes that is associated with at least two electronic identifications of the plurality of electronic identifications. The computing system 115 may identify the second common attribute in one or more ways as described with respect to the first common attribute. In certain embodiments, the computing system 115 may determine whether to select at least one electronic identification of the at least two electronic identifications of the plurality of electronic identifications for storage in another set of non-schema data in a data store (e.g., the one or more servers 120). The computing system 115 may determine whether to select at least one electronic identification of the at least two electronic identifications of the plurality of electronic identifications for storage in another set of non-schema data in a data store in one or more ways as described herein.

In certain embodiments, the computing system 115 may determine whether to select at least one electronic identification of the at least two electronic identifications of the plurality of electronic identifications for storage in another set of non-schema data in a data store (e.g., the one or more servers 120) based on, for example, the independent scores assigned to each second common attribute of the one or more attributes that are associated with the at least two electronic identifications of the plurality of electronic identifications. The computing system 115 may determine whether to select at least one electronic identification of the at least two electronic identifications of the plurality of electronic identifications for storage in another set of non-schema data in a data store (e.g., the one or more servers 120) based on, for example, the independent scores assigned to each second common attribute of the one or more attributes that are associated with the at least two electronic identifications of the plurality of electronic identifications in one or more ways as described with respect to the first common attribute.

It should be understood that the computing system 115 may identify the second common attribute at the same time that the computing system 115 identifies the first common attribute. In this embodiments, the computing system 115 may determine to select at least one electronic identification of the at least two electronic identifications of the plurality of electronic identifications based on the independent scores assigned to each second common attribute of the one or more attributes that are associated with the at least two electronic identifications of the plurality of electronic identifications while the computing system 115 determines to select at least one electronic identification of the at least two electronic identifications of the plurality of electronic identifications based on the independent scores assigned to each first common attribute of the one or more attributes that are associated with the at least two electronic identifications of the plurality of electronic identifications as described herein.

In certain embodiments, the computing system 115 may identify the second common attribute a duration of time after that the computing system 115 identifies the first common attribute. In this embodiments, the computing system 115 may determine to select at least one electronic identification of the at least two electronic identifications of the plurality of electronic identifications based on the independent scores assigned to each second common attribute of the one or more attributes that are associated with the at least two electronic identifications of the plurality of electronic identifications some time after the computing system 115 determines to select at least one electronic identification of the at least two electronic identifications of the plurality of electronic identifications based on the independent scores assigned to each first common attribute of the one or more attributes that are associated with the at least two electronic identifications of the plurality of electronic identifications as described herein.

By identifying a first common attribute and determining to select an electronic identification based on an independent score of a first common attribute associated with the electronic identification, the computing system 115 may provide accurate and up-to-date information based on the time the first common attribute was identified and the electronic identification was determined for selection. In addition, the computing system 115 may maintain accurate and up-to-date information based on the subsequent time the second common attribute was identified and the electronic identification was determined for selection again. The computing system 115 may perform this process at many subsequent times to provide continuous accurate and up-to-date information.

Figure 4:
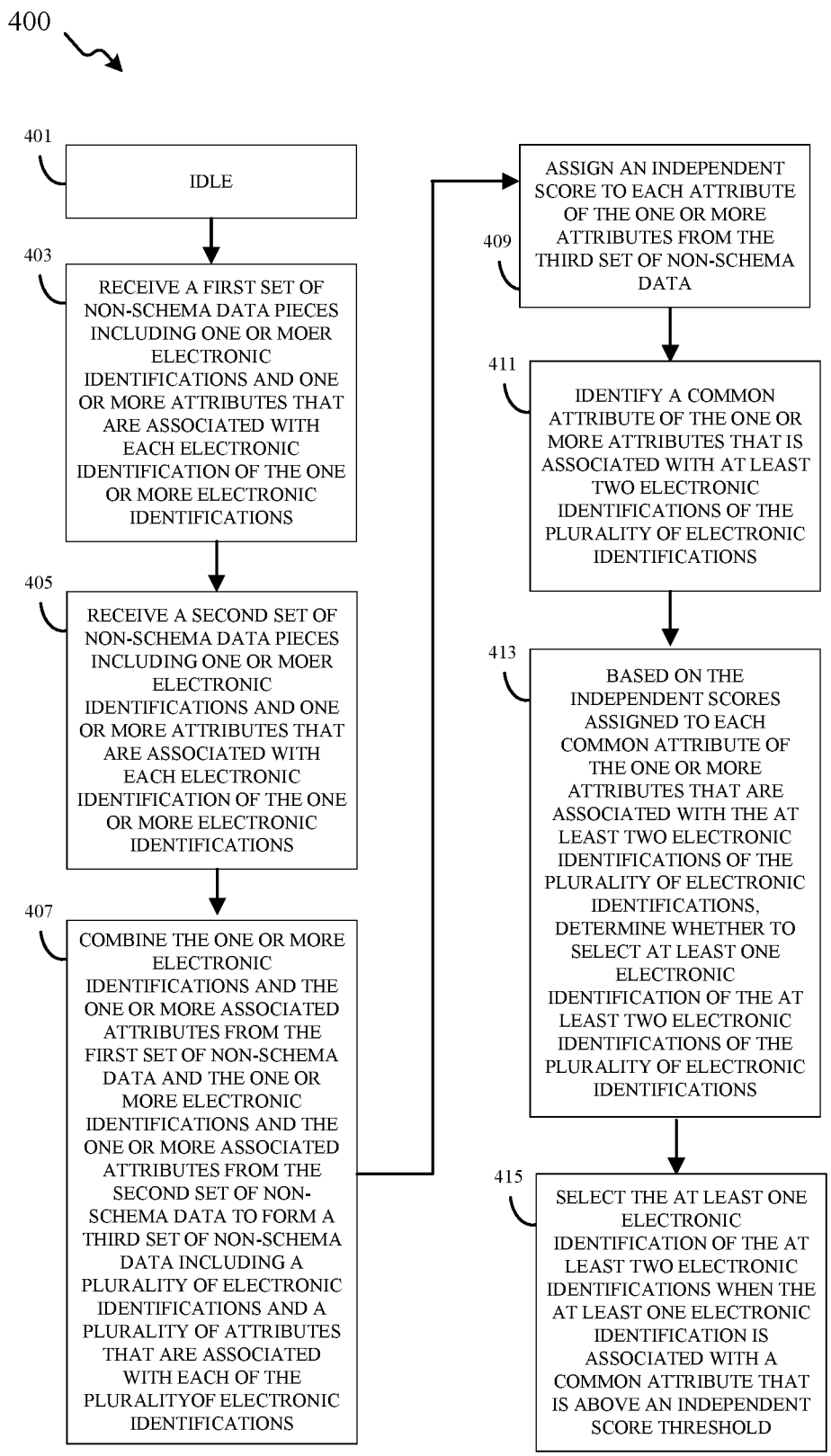

FIG. 4 illustrates a method 400 implemented by the computing system 115, utilizing the at least one processor 205, for performing one or more non-schema data reception and weighting operations according to certain embodiments of this disclosure. Although certain details will be provided with reference to the method 400 of FIG. 4, it should be understood that other embodiments may include more, less, or different method steps.

At step 401, the computing system 115 is in an idle state at least with respect to performing one or more non-schema data reception and weighting operations. Step 401 is at least similar to step 301 of method 300 illustrated in FIG. 3. At step 403, the computing system 115 receives a first set of non-schema data including one or more electronic identifications and one or more attributes that are associated with each electronic identification of the one or more electronic identifications from the first set of non-schema data. Step 403 is at least similar to step 303 of method 300 illustrated in FIG. 3. At step 405, the computing system 115 receives a second set of non-schema data including one or more electronic identifications and one or more attributes that are associated with each electronic identification of the one or more electronic identifications from the second set of non-schema data. Step 405 is at least similar to step 305 of method 300 illustrated in FIG. 3. At step 407, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 407 is at least similar to step 307 of method 300 illustrated in FIG. 3.

At step 409, the computing system 115 assigns an independent score to each attribute of the one or more attributes from the third set of non-schema data. Step 409 is at least similar to step 309 of method 300 illustrated in FIG. 3. At step 411, the computing system 115, identifies a common attribute of the one or more attributes that is associated with at least two electronic identifications of the plurality of electronic identifications. Step 411 is at least similar to step 311 of method 300 illustrated in FIG. 3. At step 413, the computing system 115, determines whether to select at least one electronic identification of the at least two electronic identifications of the plurality of electronic identifications. In certain embodiments, the computing system 115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 413 is at least similar to step 313 of method 300 illustrated in FIG. 3.

At step 415, the computing system 115 selects the at least one electronic identification of the at least two electronic identifications of the plurality of electronic identifications when the at least one electronic identification is associated with a common attribute that is above an independent score threshold. For example, a first electronic identification of the at least one electronic identifications may be associated with a common attribute. The common attribute associated with the first electronic identification may have been assigned a first value. When the first value is above an independent score threshold value, the computing system 115 may select the first electronic identification. Similarly, a second electronic identification of the at least one electronic identifications may be associated with the same common attribute. The common attribute associated with the second electronic identification may have been assigned a second value. When the second value is above an independent score threshold value, the computing system 115 may select the second electronic identification. In certain embodiments, at least one of the first value or the second value may be below an independent score threshold value. When the first value is below an independent score threshold value, the computing system 115 may not select the first electronic identification. Similarly, when the second value is below an independent score threshold value, the computing system 115 may not select the second electronic identification.

Figure 5:
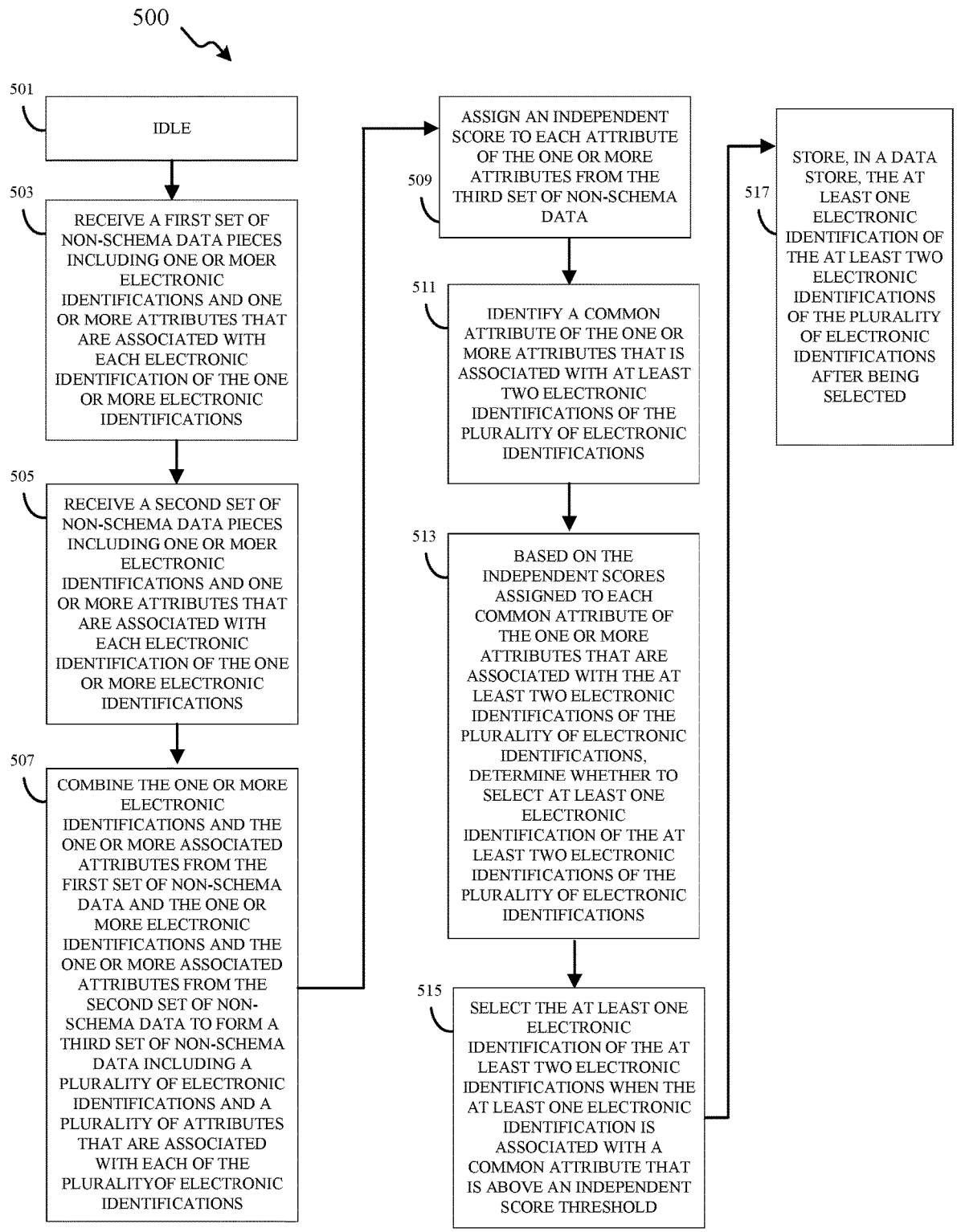

FIG. 5 illustrates a method 500 implemented by the computing system 115, utilizing the at least one processor 205, for performing one or more non-schema data reception and weighting operations according to certain embodiments of this disclosure. Although certain details will be provided with reference to the method 500 of FIG. 5, it should be understood that other embodiments may include more, less, or different method steps.

At step 501, the computing system 115 is in an idle state at least with respect to performing one or more non-schema data reception and weighting operations. Step 501 is at least similar to step 301 of method 300 illustrated in FIG. 3. At step 503, the computing system 115 receives a first set of non-schema data including one or more electronic identifications and one or more attributes that are associated with each electronic identification of the one or more electronic identifications from the first set of non-schema data. Step 503 is at least similar to step 303 of method 300 illustrated in FIG. 3. At step 505, the computing system 115 receives a second set of non-schema data including one or more electronic identifications and one or more attributes that are associated with each electronic identification of the one or more electronic identifications from the second set of non-schema data. Step 505 is at least similar to step 305 of method 300 illustrated in FIG. 3. At step 507, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 507 is at least similar to step 307 of method 300 illustrated in FIG. 3.

At step 509, the computing system 115 assigns an independent score to each attribute of the one or more attributes from the third set of non-schema data. Step 509 is at least similar to step 309 of method 300 illustrated in FIG. 3. At step 511, the computing system 115, identifies a common attribute of the one or more attributes that is associated with at least two electronic identifications of the plurality of electronic identifications. Step 511 is at least similar to step 311 of method 300 illustrated in FIG. 3. At step 513, the computing system 115, determines whether to select at least one electronic identification of the at least two electronic identifications of the plurality of electronic identifications. In certain embodiments, the computing system 115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 513 is at least similar to step 313 of method 300 illustrated in FIG. 3. At step 515, the computing system 115 selects the at least one electronic identification of the at least two electronic identifications of the plurality of electronic identifications when the at least one electronic identification is associated with a common attribute that is above an independent score threshold. Step 515 is at least similar to step 415 of method 400 illustrated in FIG. 4.

At step 517, the computing system 115 stores, in a data store, the at least one electronic identification of the at least two electronic identifications of the plurality of electronic identifications after being selected. For example, after determining to select at least one electronic identification of the at least two electronic identifications from the third set of non-schema data, the computing system 115 may select the at least one electronic identification of the at least two electronic identifications from the third set of non-schema data and generate a fourth set of data that includes the at least one electronic identification of the at least two electronic identifications from the third set of non-schema data. The computing system 115 may store the fourth set of data in a data store (e.g., the one or more servers 120).

Figure 6:
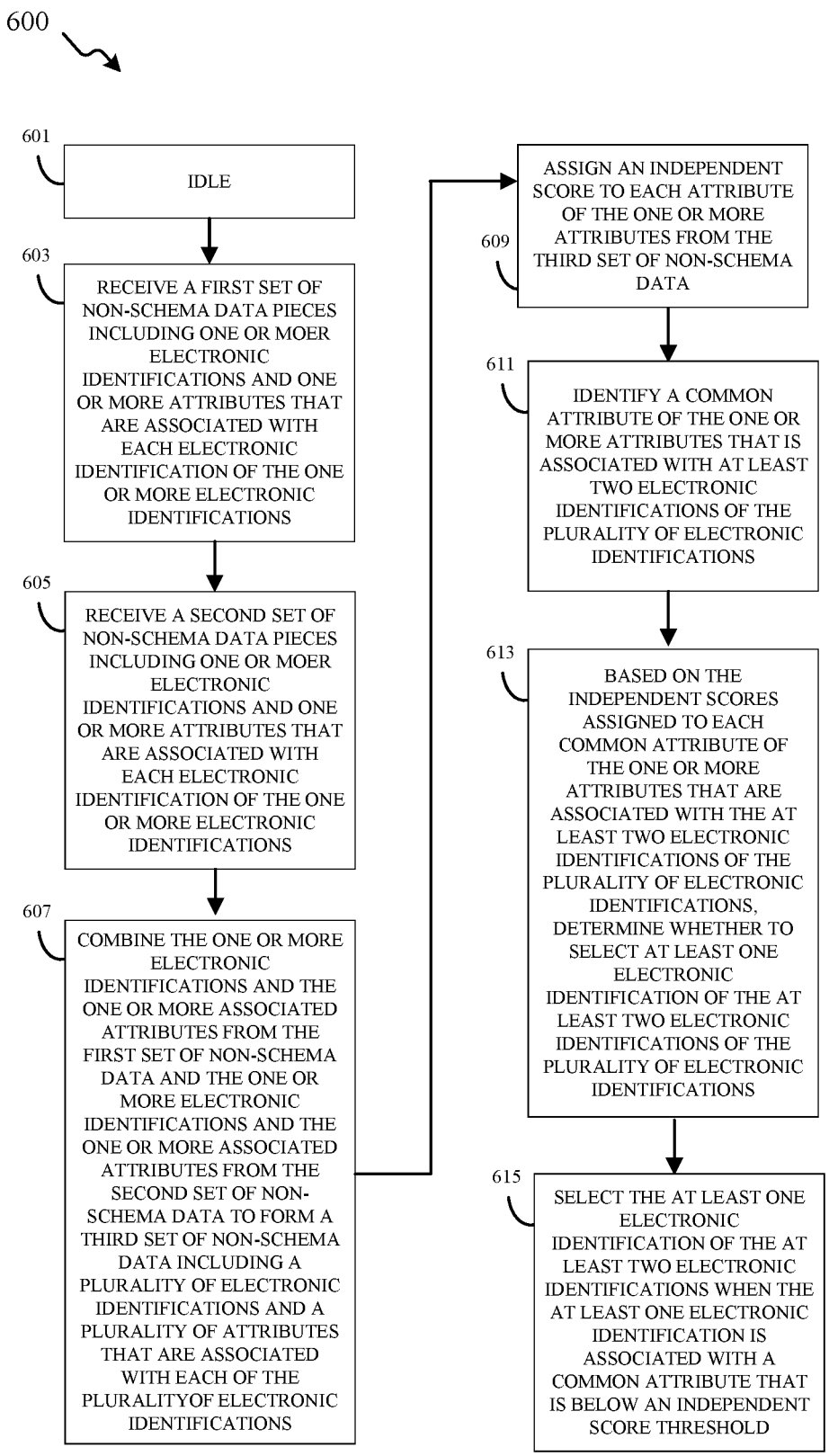

FIG. 6 illustrates a method 600 implemented by the computing system 115, utilizing the at least one processor 205, for performing one or more non-schema data reception and weighting operations according to certain embodiments of this disclosure. Although certain details will be provided with reference to the method 600 of FIG. 6, it should be understood that other embodiments may include more, less, or different method steps.

At step 601, the computing system 115 is in an idle state at least with respect to performing one or more non-schema data reception and weighting operations. Step 601 is at least similar to step 301 of method 300 illustrated in FIG. 3. At step 603, the computing system 115 receives a first set of non-schema data including one or more electronic identifications and one or more attributes that are associated with each electronic identification of the one or more electronic identifications from the first set of non-schema data. Step 603 is at least similar to step 303 of method 300 illustrated in FIG. 3. At step 605, the computing system 115 receives a second set of non-schema data including one or more electronic identifications and one or more attributes that are associated with each electronic identification of the one or more electronic identifications from the second set of non-schema data. Step 605 is at least similar to step 305 of method 300 illustrated in FIG. 3. At step 607, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 607 is at least similar to step 307 of method 300 illustrated in FIG. 3.

At step 609, the computing system 115 assigns an independent score to each attribute of the one or more attributes from the third set of non-schema data. Step 609 is at least similar to step 309 of method 300 illustrated in FIG. 3. At step 611, the computing system 115, identifies a common attribute of the one or more attributes that is associated with at least two electronic identifications of the plurality of electronic identifications. Step 611 is at least similar to step 311 of method 300 illustrated in FIG. 3. At step 613, the computing system 115, determines whether to select at least one electronic identification of the at least two electronic identifications of the plurality of electronic identifications. In certain embodiments, the computing system 115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 613 is at least similar to step 313 of method 300 illustrated in FIG. 3.

At step 615, the computing system 115 selects the at least one electronic identification of the at least two electronic identifications of the plurality of electronic identifications when the at least one electronic identification is associated with a common attribute that is below an independent score threshold. For example, a first electronic identification of the at least one electronic identifications may be associated with a common attribute. The common attribute associated with the first electronic identification may have been assigned a first value. When the first value is below an independent score threshold value, the computing system 115 may select the first electronic identification. Similarly, a second electronic identification of the at least one electronic identifications may be associated with the same common attribute. The common attribute associated with the second electronic identification may have been assigned a second value. When the second value is below an independent score threshold value, the computing system 115 may select the second electronic identification. In certain embodiments, at least one of the first value or the second value may be above an independent score threshold value. When the first value is above an independent score threshold value, the computing system 115 may not select the first electronic identification. Similarly, when the second value is above an independent score threshold value, the computing system 115 may not select the second electronic identification.

Figure 7:
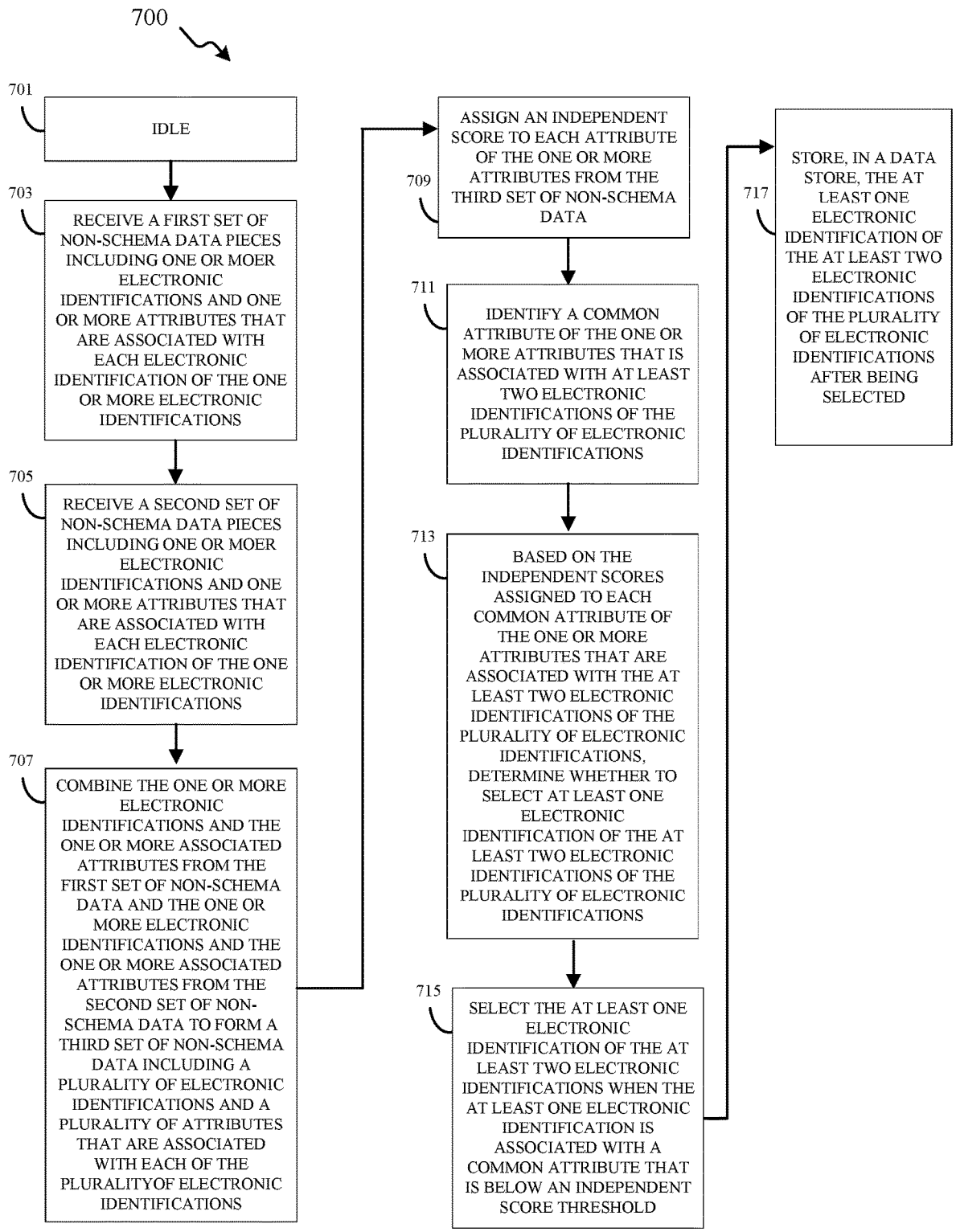

FIG. 7 illustrates a method 700 implemented by the computing system 115, utilizing the at least one processor 205, for performing one or more non-schema data reception and weighting operations according to certain embodiments of this disclosure. Although certain details will be provided with reference to the method 700 of FIG. 7, it should be understood that other embodiments may include more, less, or different method steps.

At step 701, the computing system 115 is in an idle state at least with respect to performing one or more non-schema data reception and weighting operations. Step 701 is at least similar to step 301 of method 300 illustrated in FIG. 3. At step 703, the computing system 115 receives a first set of non-schema data including one or more electronic identifications and one or more attributes that are associated with each electronic identification of the one or more electronic identifications from the first set of non-schema data. Step 703 is at least similar to step 303 of method 300 illustrated in FIG. 3. At step 705, the computing system 115 receives a second set of non-schema data including one or more electronic identifications and one or more attributes that are associated with each electronic identification of the one or more electronic identifications from the second set of non-schema data. Step 705 is at least similar to step 305 of method 300 illustrated in FIG. 3. At step 707, combines the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data. Step 707 is at least similar to step 307 of method 300 illustrated in FIG. 3.

At step 709, the computing system 115 assigns an independent score to each attribute of the one or more attributes from the third set of non-schema data. Step 709 is at least similar to step 309 of method 300 illustrated in FIG. 3. At step 711, the computing system 115, identifies a common attribute of the one or more attributes that is associated with at least two electronic identifications of the plurality of electronic identifications. Step 711 is at least similar to step 311 of method 300 illustrated in FIG. 3. At step 713, the computing system 115, determines whether to select at least one electronic identification of the at least two electronic identifications of the plurality of electronic identifications. In certain embodiments, the computing system 115 may determine whether to select at least one electronic identification of the at least two electronic identifications of the plurality of electronic identifications based on the independent scores assigned to each common attribute of the one or more attributes that are associated with the at least two electronic identifications of the plurality of electronic identifications. Step 713 is at least similar to step 313 of method 300 illustrated in FIG. 3. At step 715, the computing system 115 selects the at least one electronic identification of the at least two electronic identifications of the plurality of electronic identifications when the at least one electronic identification is associated with a common attribute that is below an independent score threshold. Step 715 is at least similar to step 615 of method 600 illustrated in FIG. 6.

At step 717, the computing system 115 stores, in a data store, the at least one electronic identification of the at least two electronic identifications of the plurality of electronic identifications after being selected. For example, after determining to select at least one electronic identification of the at least two electronic identifications from the third set of non-schema data, the computing system 115 may select the at least one electronic identification of the at least two electronic identifications from the third set of non-schema data and generate a fourth set of data that includes the at least one electronic identification of the at least two electronic identifications from the third set of non-schema data. The computing system 115 may store the fourth set of data in a data store (e.g., the one or more servers 120). Step 717 is at least similar to step 517 of method 500 illustrated in FIG. 5.

Figure 8:
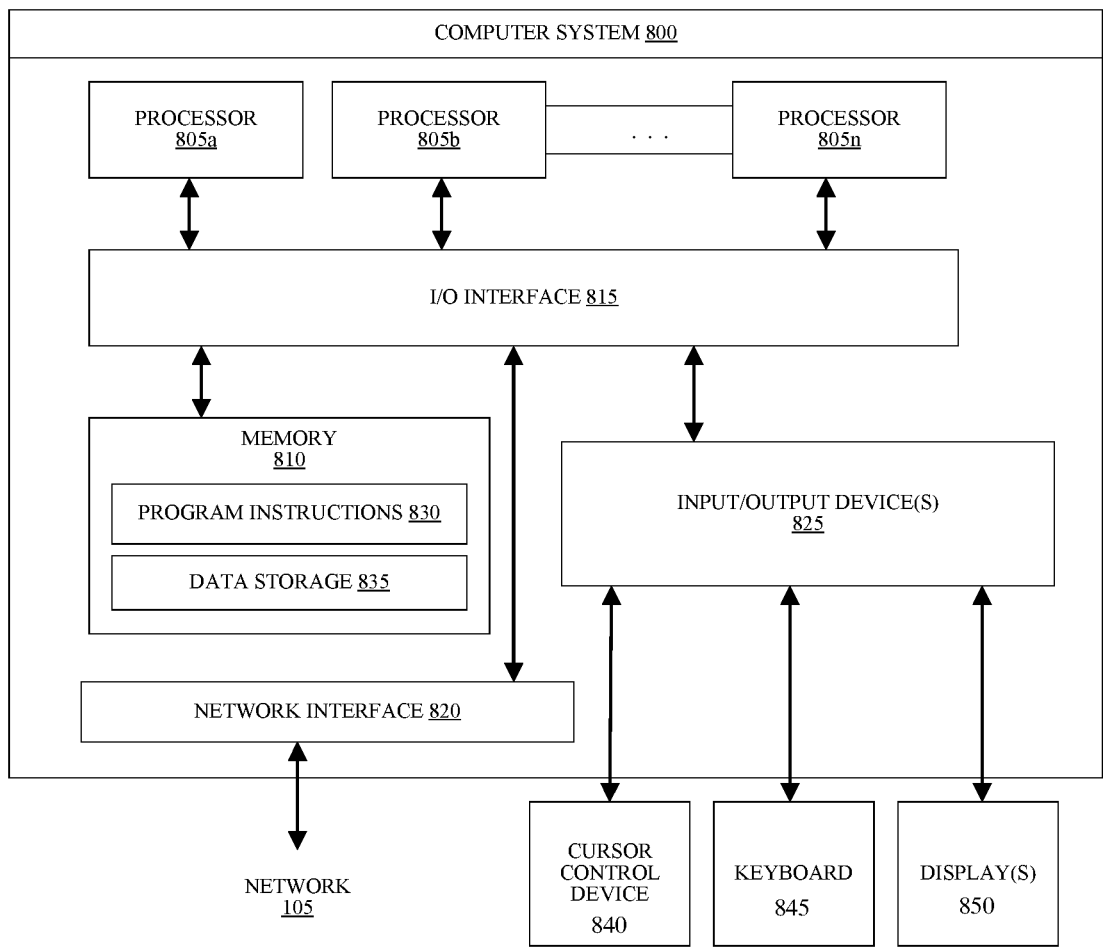
FIG. 8 illustrates a non-limiting, example computer system configured to implement aspects of apparatuses, systems, and methods according to certain embodiments of this disclosure.

FIG. 8 illustrates a non-limiting, example computer system 800 configured to implement systems and methods for performing one or more interactive gaming operations according to certain embodiments of this disclosure. FIG. 8 illustrates a computer system 800 that is configured to execute any and all of the embodiments described herein. In certain embodiments, the computer system 800 describes at least some of the components of the one or more electronic devices 110, the computing system 115, the one or more servers 120, the one or more web browsers 125, or the one or more client systems 130 illustrated in FIGS. 1 and 2. In different embodiments, the computer system 800 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 301 of a handset), an application server, a storage device, a television, a peripheral device such as a switch, modem, router, or in general any type of computing or electronic device.

Various embodiments of a system and method for receiving and weighting non-schema data pieces, as described herein, may be executed on one or more computer systems 800, which may interact with various other devices. In the illustrated embodiment, the computer system 800 includes one or more processors 805 coupled to a system memory 810 via an input/output (I/O) interface 815. The computer system 800 further includes a network interface 820 coupled to I/O interface 815, and one or more input/output devices 825, such as cursor control device 840, keyboard 845, and display(s) 850. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 805a, or a multiprocessor system including several processors 805a-805n (e.g., two, four, eight, or another suitable number). The processors 805 may be any suitable processor capable of executing instructions. For example, in various embodiments the processors 805 may be general-purpose or embedded processors implementing any of a variety of instruction set architectures (ISAs), such as the x86, PowerPC, SPARC, or MIPS ISAs, or any other suitable ISA. In multiprocessor systems, each of processors 805 may commonly, but not necessarily, implement the same ISA.

The system memory 810 may be configured to store the program instructions 830 and/or existing state information and ownership transition condition data in the data storage 835 accessible by the processor 805. In various embodiments, the system memory 810 may be implemented using any suitable memory technology, such as static random access memory (SRAM), synchronous dynamic RAM (SDRAM), nonvolatile/Flash-type memory, or any other type of memory. In the illustrated embodiment, the program instructions 830 may be configured to implement a system for performing one or more non-schema data reception and weighting operations incorporating any of the functionality, as described herein. In some embodiments, program instructions and/or data may be received, sent, or stored upon different types of computer-accessible media or on similar media separate from the system memory 810 or the computer system 800. The computer system 800 is described as implementing at least some of the functionality of functional blocks of previous Figures.

In one embodiment, the I/O interface 815 may be configured to coordinate I/O traffic between the processor 805, the system memory 810, and any peripheral devices in the device, including the network interface 820 or other peripheral interfaces, such as the input/output devices 825. In some embodiments, the I/O interface 815 may perform any necessary protocol, timing or other data transformations to convert data signals from one component (e.g., the system memory 810) into a format suitable for use by another component (e.g., the processor 805). In some embodiments, the I/O interface 815 may include support for devices attached through various types of peripheral buses, such as a variant of the Peripheral Component Interconnect (PCI) bus standard or the Universal Serial Bus (USB) standard, for example. In some embodiments, the function of the I/O interface 815 may be split into two or more separate components, such as a north bridge and a south bridge, for example. Also, in some embodiments some or all of the functionality of the I/O interface 815, such as an interface to the system memory 810, may be incorporated directly into the processor 805.

The network interface 820 may be configured to allow data to be exchanged between the computer system 800 and other devices attached to the network 105 or between nodes of the computer system 800. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 820 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 825 may, in some embodiments, include one or more display terminals, keyboards, keypads, touchpads, scanning devices, voice, or optical recognition devices, or any other devices suitable for entering or accessing data by one or more the computer systems 800. Further, various other sensors may be included in the I/O devices 825, such as imaging sensors, barometers, altimeters, LIDAR, or any suitable environmental sensor. Multiple input/output devices 825 may be present in the computer system 800 or may be distributed on various nodes of the computer system 800. In some embodiments, similar input/output devices may be separate from the computer system 800 and may interact with one or more nodes of the computer system 800 through a wired or wireless connection, such as over the network interface 820.

As shown in FIG. 8, the memory 810 may include program instructions 830, which may be processor-executable to implement any element or action, as described herein. In one embodiment, the program instructions may implement at least a portion of methods described herein, such as the methods illustrated by FIGS. 3-7. In other embodiments, different elements and data may be included. Note that the data storage 835 may include any data or information, as described herein.

Those skilled in the art will appreciate that the computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 800 may be transmitted to the computer system 800 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for performing one or more non-schema data reception and weighting operations, including a computing system. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
a computing system communicatively linked to one or more servers and comprising at least one memory and at least one processor, wherein the computing system is configured to:
receive a first set of non-schema data including one or more electronic identifications and one or more attributes that are associated with each electronic identification of the one or more electronic identifications from the first set of non-schema data;
receive a second set of non-schema data including one or more electronic identifications and one or more attributes that are associated with each electronic identification of the one or more electronic identifications from the second set of non-schema data;
combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data;
assign an independent score to each attribute of the one or more attributes from the third set of non-schema data;
identify a common attribute of the one or more attributes that is associated with at least two electronic identifications of the plurality of electronic identifications; and
based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

2. The apparatus of claim 1, wherein the independent score assigned to each attribute of the one or more attributes from the third set of non-schema data is based on at least one of a quantity of same attributes associated with a particular electronic identification, a time when an attribute manifested, or a quantity of same attributes associated with a first electronic identification and a second electronic identification that is linked to the first electronic identification.

3. The apparatus of claim 1, wherein the computing system is further configured to:
   select the at least one electronic identification of the at least two electronic identifications of the plurality of electronic identifications when the at least one electronic identification is associated with a common attribute that is above an independent score threshold.

4. The apparatus of claim 3, wherein the computing system is further configured to:
   store, in a data store, the at least one electronic identification of the at least two electronic identifications of the plurality of electronic identifications after being selected.

5. The apparatus of claim 1, wherein the computing system is further configured to:
   select the at least one electronic identification of the at least two electronic identifications of the plurality of electronic identifications when the at least one electronic identification is associated with a common attribute that is below an independent score threshold.

6. The apparatus of claim 5, wherein the computing system is further configured to:
   store, in a data store, the at least one electronic identification of the at least two electronic identifications of the plurality of electronic identifications after being selected.

7. The apparatus of claim 1, wherein the common attribute is a first common attribute, and wherein the computing system is further configured to:
   based on the independent scores assigned to each first common attribute of the one or more attributes that are associated with the at least two electronic identifications of the plurality of electronic identifications, determine whether to select the at least one electronic identification of the at least two electronic identifications of the plurality of electronic identifications for storage in a first set of non-schema data;
   identify a second common attribute of the one or more attributes that is associated with at least two electronic identifications of the plurality of electronic identifications; and
   based on the independent scores assigned to each second common attribute of the one or more attributes that are associated with the at least two electronic identifications of the plurality of electronic identifications, determine whether to select at least one electronic identification of the at least two electronic identifications of the plurality of electronic identifications for storage in a second set of non-schema data.

8. A method implemented by a computing system, the method comprising:
   receiving, by the computing system, a first set of non-schema data including one or more electronic identifications and one or more attributes that are associated with each electronic identification of the one or more electronic identifications from the first set of non-schema data;
   receiving, by the computing system, a second set of non-schema data including one or more electronic identifications and one or more attributes that are associated with each electronic identification of the one or more electronic identifications from the second set of non-schema data;
   combining, by the computing system, the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data;
   assigning, by the computing system, an independent score to each attribute of the one or more attributes from the third set of non-schema data;
   identifying, by the computing system, a common attribute of the one or more attributes that is associated with at least two electronic identifications of the plurality of electronic identifications; and
   based on the independent scores assigned to each common attribute of the one or more attributes that are associated with the at least two electronic identifications of the plurality of electronic identifications, determining, by the computing system, whether to select at least one electronic identification of the at least two electronic identifications of the plurality of electronic identifications.

9. The method of claim 8, wherein the independent score assigned to each attribute of the one or more attributes from the third set of non-schema data is based on at least one of a quantity of same attributes associated with a particular electronic identification, a time when an attribute manifested, or a quantity of same attributes associated with a first electronic identification and a second electronic identification that is linked to the first electronic identification.

10. The method of claim 8, further comprising:
    selecting, by the computing system, the at least one electronic identification of the at least two electronic identifications of the plurality of electronic identifications when the at least one electronic identification is associated with a common attribute that is above an independent score threshold.

11. The method of claim 10, further comprising:
    storing, by the computing system in a data store, the at least one electronic identification of the at least two electronic identifications of the plurality of electronic identifications after being selected.

12. The method of claim 8, further comprising:
    selecting, by the computing system, the at least one electronic identification of the at least two electronic identifications of the plurality of electronic identifications when the at least one electronic identification is associated with a common attribute that is below an independent score threshold.

13. The method of claim 12, further comprising:
    storing, by the computing system in a data store, the at least one electronic identification of the at least two electronic identifications of the plurality of electronic identifications after being selected.

14. The apparatus of claim 8, wherein the common attribute is a first common attribute, and wherein the computing system is further configured to:

based on the independent scores assigned to each first common attribute of the one or more attributes that are associated with the at least two electronic identifications of the plurality of electronic identifications, determine whether to select the at least one electronic identification of the at least two electronic identifications of the plurality of electronic identifications for storage in a first set of non-schema data;

identify a second common attribute of the one or more attributes that is associated with at least two electronic identifications of the plurality of electronic identifications; and based on the independent scores assigned to each second common attribute of the one or more attributes that are associated with the at least two electronic identifications of the plurality of electronic identifications, determine whether to select at least one electronic identification of the at least two electronic identifications of the plurality of electronic identifications for storage in a second set of non-schema data.

15. A non-transitory, computer-readable storage medium storing one or more executable instructions that, when executed by at least one processor, causes the at least one processor to:

receive a first set of non-schema data including one or more electronic identifications and one or more attributes that are associated with each electronic identification of the one or more electronic identifications from the first set of non-schema data;

receive a second set of non-schema data including one or more electronic identifications and one or more attributes that are associated with each electronic identification of the one or more electronic identifications from the second set of non-schema data;

combine the one or more electronic identifications and the one or more attributes that are associated with each electronic identification of the one more electronic identifications from the first set of non-schema data and the one or more electronic identifications and the one or more attributes that are associated with each electronic identification of the one more electronic identifications from the second set of non-schema data to form a third set of non-schema data including a plurality of electronic identifications and one or more attributes that are associated with each electronic identification of the plurality of electronic identifications from the third set of non-schema data;

assign an independent score to each attribute of the one or more attributes from the third set of non-schema data;

identify a common attribute of the one or more attributes that is associated with at least two electronic identifications of the plurality of electronic identifications; and based on the independent scores assigned to each common attribute of the one or more attributes that are associated with the at least two electronic identifications of the plurality of electronic identifications, determine whether to select at least one electronic identification of the at least two electronic identifications of the plurality of electronic identifications.

16. The non-transitory, computer-readable storage medium of claim 15, wherein the independent score assigned to each attribute of the one or more attributes from the third set of non-schema data is based on at least one of a quantity of same attributes associated with a particular electronic identification, a time when an attribute manifested, or a quantity of same attributes associated with a first electronic identification and a second electronic identification that is linked to the first electronic identification.

17. The non-transitory, computer-readable storage medium of claim 15, wherein the one or more executable instructions, that when executed by the at least one processor, further causes the at least one processor to:

select the at least one electronic identification of the at least two electronic identifications of the plurality of electronic identifications when the at least one electronic identification is associated with a common attribute that is above an independent score threshold.

18. The non-transitory, computer-readable storage medium of claim 17, wherein the one or more executable instructions, that when executed by the at least one processor, further causes the at least one processor to:

store, in a data store, the at least one electronic identification of the at least two electronic identifications of the plurality of electronic identifications after being selected.

19. The non-transitory, computer-readable storage medium of claim 15, wherein the one or more executable instructions, that when executed by the at least one processor, further causes the at least one processor to:

select the at least one electronic identification of the at least two electronic identifications of the plurality of electronic identifications when the at least one electronic identification is associated with a common attribute that is below an independent score threshold.

20. The non-transitory, computer-readable storage medium of claim 19, wherein the one or more executable instructions, that when executed by the at least one processor, further causes the at least one processor to:

store, in a data store, the at least one electronic identification of the at least two electronic identifications of the plurality of electronic identifications after being selected.

* * * * *